United States Patent
Lammers et al.

(10) Patent No.: US 8,527,318 B2
(45) Date of Patent: Sep. 3, 2013

(54) CAMPAIGN MANAGEMENT IN MULTIPLE COMMUNICATION CHANNELS

(75) Inventors: Guido Lammers, Wiesloch (DE); Martin Steiert, Heidelberg (DE); Horst Gerlach, Saarlouis (DE)

(73) Assignee: SAP AG, Walldorf (DE)

( * ) Notice: Subject to any disclaimer, the term of this patent is extended or adjusted under 35 U.S.C. 154(b) by 2667 days.

(21) Appl. No.: 10/426,936

(22) Filed: Apr. 30, 2003

(65) Prior Publication Data

US 2004/0220849 A1 Nov. 4, 2004

(51) Int. Cl.
G06Q 30/00 (2012.01)

(52) U.S. Cl.
USPC ............................................. 705/7.29

(58) Field of Classification Search
USPC ............................................. 705/7.29
See application file for complete search history.

(56) References Cited

U.S. PATENT DOCUMENTS

| | | | |
|---|---|---|---|
| 6,236,977 B1 * | 5/2001 | Verba et al. | 705/10 |
| 6,240,411 B1 | 5/2001 | Thearling | |
| 6,345,094 B1 * | 2/2002 | Khan et al. | 379/266.07 |
| 6,829,348 B1 * | 12/2004 | Schroeder et al. | 379/265.09 |
| 7,039,600 B1 * | 5/2006 | Meek et al. | 705/14 |
| 7,519,665 B1 * | 4/2009 | Shimada et al. | 709/206 |
| 2001/0037210 A1 * | 11/2001 | Hirayama | 705/1 |
| 2002/0052775 A1 | 5/2002 | Fisher et al. | |
| 2004/0215501 A1 * | 10/2004 | d'Ornano | 705/10 |
| 2005/0027591 A9 * | 2/2005 | Gailey et al. | 705/14 |
| 2005/0075925 A1 * | 4/2005 | Sash | 705/14 |

FOREIGN PATENT DOCUMENTS

CA   2318644 A1 *   3/2002

OTHER PUBLICATIONS

PowerPoint Presentation, CRM Analytics: RFM Analysis, SAP AG, 24 ps, 2003.
http://www.unicacorp.com/products/compaign_detail.html—"Enterprise Marketing Management—Unica Corporation," printed from the Internet Aug. 13, 2003, 4 ps.
http://www.marketswitch.com/products/outbound_marketing.html—"Marketswitch: Products: TRUE for Outbound Marketing," printed from the Internet Aug. 13, 2003, 2 ps.
"Introduction to CRM Analytics," Gartner Symposium IT XPO, 2002, 19 ps.
http://www.cogita.co.nz/epicor.htm—"Epicor Product Page," printed from the Internet Jan. 28, 2003, 3 ps.
"EMEA CRO Magic Quadrant—3Q02," Markets, M-17-2063, J. Radcliffe, G. Herschel, Gartner Research, 2002, 7 ps.

(Continued)

*Primary Examiner* — Justin M Pats
(74) *Attorney, Agent, or Firm* — Fish & Richardson P.C.

(57) ABSTRACT

Methods and systems for managing marketing campaigns. A communication module is capable of executing a first step of a marketing campaign, and is capable of handling customer responses to the marketing campaign received through a variety of communication channels, regardless of which channel was used for contacting the customers. Customers may respond by email, telephone, fax, in person, through an internet site, by letter or by other modes of communication. An object generation module generates an object containing information from the response, uses the information to match the response with the marketing campaign, and links the object to the marketing campaign. A person may override the object generation module's matching by inputting the identity of another marketing campaign for matching. A campaign management module receives the object from the object generation module. A user may modify how the system matches responses with marketing campaigns.

23 Claims, 3 Drawing Sheets

(56) References Cited

OTHER PUBLICATIONS

"EMEA CRO Magic Quadrant—3Q02," Decision Framework, J. Radcliffe, Gartner Research, 2002, 7 ps.
"Alternative Data Report," Gartner, 2000-2002, 85 ps.
"Campaign Management Software," Quaero Answers, 2001, 13 ps.
http://www.peoplesoft.com/corp/en/products/line/crm/marketing/features.asp—"Marketing Features," printed from the Internet Jan. 28, 2003, 2 ps.
"Operations Research-Spektrum," Springer-Verlag, vol. 11, No. 3, ps. 121-174, Aug. 1989.
"Tabu Search —Part I," ORSA Journal on Computing, vol. 1, No. 3, Summer 1989, 18 ps.
"Tabu Search —Part II," ORSA Journal on Computing, vol. 2, No. 1, Winter 1990, 30 ps.
"Future Paths for Integer Programming and Links to Artificial Intelligence," Computers & Operations Research, vol. 13, No. 5, ps. 533-549, 1986.
"A Tutorial on Tabu Search," Alain Hertz, Eric Taillard, Dominique de Werra, 13 ps, 1992.
http://www.epiphany.com/products/images/screen_1CM.gif—"PortaLaptop," printed from the Internet Jan. 28, 2003, 1 p.
http://www.epiphany.com/products/images/screen_3RT.gif—"Ideal Customer," printed from the internet Jan. 28, 2003, 1 p.
http://www.epiphany.com/products/images/screen_eirt2.gif—"RealTime Decisioning Analysis," printed from the Internet Jan. 28, 2003, 1 p.
http://www.epiphany.com/products/images/screen_2CME.gif—"Import E-mail Content," printed from the Internet Jan. 28, 2003, 1 p.

\* cited by examiner

CAMPAIGN MANAGEMENT IN MULTIPLE COMMUNICATION CHANNELS

TECHNICAL FIELD

The invention relates to automated campaign management.

BACKGROUND

Campaign management generally involves the management of campaign activities directed to groups of existing and/or prospective customers. Typically, a company engages in a marketing campaign as a way of communicating specific business messages. For simplicity, all the recipients of such business messages will here be referred to as customers, whether or not they have an existing customer relationship. The messages usually can be any kind of business communication, such as everything from a pure advertisement to a direct offer that the customer may accept. Frequently, the company running a marketing campaign seeks an initial response from customers to gauge interest in the subject of the campaign, and then intends to use the responses in designing and directing further campaign activities.

The customers are often contacted by conventional means such as by letter, telephone, email or a personal visit, but other channels of communication are also possible, such as facsimile and specially designed web sites. The partial computerization of these activities has allowed marketing campaigns to be executed toward larger target groups with increased efficiency. For example, a computer-based marketing campaign can transmit several hundred thousand emails or more to a selected target group.

However, the usefulness of being able to direct campaign activities to large target groups is significantly reduced by difficulties in managing the responses from customers in the target groups. Even a modest response rate from the customers may produce a tremendous number of responses if the campaign is directed at a very large target group. And if the response rate is sufficiently high, the volume of responses may simply be unmanageable for non-automated processing. Every received response should also be matched with the campaign activity that triggered it, a task that becomes increasingly difficult when a company has several marketing campaigns running at once.

It has been attempted to solve this problem in some existing campaign management systems for a limited category of marketing campaigns, namely campaigns where emails are sent to customers and where customers respond by email. A system may include a campaign identifier in emails sent to a target group. If a customer includes the identifier when responding to the marketing campaign—for example by sending a response email incorporating the original email—the identifier may allow the company running the campaign to identify the response with the campaign that triggered it.

However, even such solutions may be insufficient to overcome certain significant problems with automated campaigns, because some responses arrive through different channels of communication than the one used for the campaign activity. For example, a customer who receives a marketing letter may decide to respond by an email or a phone call to the company running the marketing campaign. Or a customer who is contacted by telephone may later send a fax to the company as a sign of interest in the subject of the marketing campaign. If customer responses are received but never matched with the campaign, or detected too late to be taken into consideration for subsequent marketing activities, these responses may be essentially worthless to the company. Additionally, the customers may become frustrated if their responses go unanswered or if the company appears slow in reacting to them. The marketing campaign may then partly become a wasted effort for the company. Successful campaign management requires the ability to reliably detect customer responses received through a multitude of communication channels and to efficiently match them with their respective campaign activities.

SUMMARY OF THE INVENTION

The invention provides methods and systems relating to campaign management, and computer-readable medium with program instructions for executing inventive methods. In a first aspect, the invention provides a method of managing a marketing campaign. The method comprises performing a first campaign step of a first marketing campaign, the first campaign step being directed at a plurality of customers. It is provided that responses to the first campaign step from the customers can be received through any of a plurality of communication channels, the plurality of communication channels including at least personal communication, mail, telephone, a public computer network, fax and electronic mail. A response to the first campaign step is received from one of the customers through one of the communication channels. A first object is generated that contains information from the response. The information in the object is used to match the response with the first marketing campaign.

In some embodiments, the response may be received in personal communication with the customer and the first object may then comprise a visit activity file. The visit activity file may have been generated from the first campaign step.

In some embodiments, the campaign steps through which a customer has been contacted are stored in a database. The database may be searched for a contact history associated with the customer.

In some embodiments, phone numbers may be used in determining the subsequent campaign step to be directed at the customer. If the customer responds by calling a telephone number, the telephone number through which the response is received can be used in matching the response with the first marketing campaign. A telephone number from which a customer calls in making the response may be used to identify the customer. A contact history for the customer may be searched to identify campaign steps that has been directed at the customer.

In some embodiments, a second object may be generated that corresponds to the first campaign step. The second object may be stored in a table as an outbound contact. The first object may be stored in the table as an inbound contact. The second object may be generated in connection with the first campaign step or it may be generated retroactively after receiving the response.

In a second aspect, the invention provides a system for managing a marketing campaign. The system comprises program instructions comprising a communication module that, when executed by a processor, is capable of executing a first campaign step of a first marketing campaign, the first campaign step being directed at a plurality of customers. The communication module is capable of handling responses to the first campaign step from the customers received through any of a plurality of communication channels. The plurality of communication channels include at least personal communication, mail, telephone, a public computer network, fax and email. The system comprises program instructions comprising an object generation module that, when executed by a processor, is capable of generating a first object that contains information from a specific customer response to the first campaign step. The system comprises program instructions comprising a campaign management module that, when executed by a processor, instructs the communication module to execute the first step of the marketing campaign, wherein the communication module instructs the object generation module to generate the first object, wherein the object generation module uses the information in the first object to match the response with the first marketing campaign and wherein the campaign management module receives the first object from the object generation module.

Advantages of the invention may include one or more of the following. The efficiency of marketing campaigns may be increased by the ability to match customer responses received through a multitude of communication channels with their marketing campaigns where previously they probably would not be matched. Customer responses received through a multitude of communication channels may be more quickly matched with their marketing campaign.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numerals in the drawing indicate like elements.

DETAILED DESCRIPTION

Figure 1:
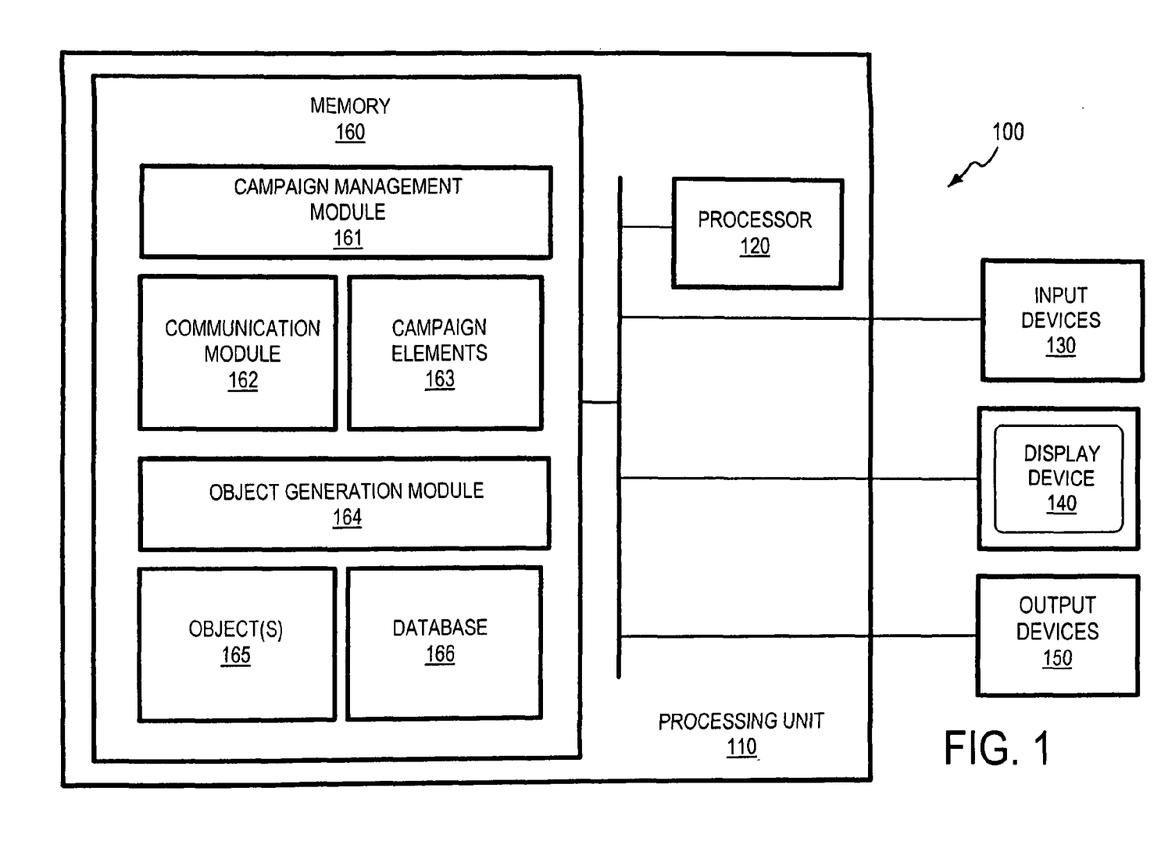
FIG. 1 is a block diagram of a computer system containing components in accordance with the invention.

FIG. 1 shows a computer system 100 that may serve as a platform for an automated campaign management system. The system 100 comprises a processing unit 110 with a processor 120 that, among other things, executes instructions stored in memory. Input devices 130 may be operably connected to the processor 120 to input information into the system 100. The input devices 130 may include a keyboard, a mouse, a network connection, and/or one or more conventional interfaces by which information from various communication channels may be input into the system 100. For example, the system 100 may receive customer responses to marketing activities through input devices 130. A display device 140 may be operably connected to the processor 120 to provide a video display for a user of the system 100. The system 100 may comprise output devices 150 operably connected to the processor 120. The output devices 150 may include storage devices, a network connection, and/or one or more conventional interfaces by which information may be output to various communication channels. For example, the system 100 may direct marketing activities toward customers through output devices 150.

The system 100 has a memory 160 that is accessible to the processor 120. As is conventional, the memory of the processing unit 110 may include random access memory (RAM), read-only memory (ROM), or a combination of RAM and ROM. The ROM may provide non-volatile data storage for the system 100. During operation, program instructions may be loaded into the RAM such that the processor 120 can execute them.

The memory 160 comprises software instructions for performing campaign management in accordance with the invention. The memory comprises a campaign management module 161 that may instruct a communication module 162 to initiate a first step of a marketing campaign. The communication module 162 may initiate the first step by executing one or more of campaign elements 163. An object generation module 164 may generate one or more object(s) 165 containing information from customer responses. The object generation module 164 may also link the generated object to the marketing campaign. A database 166 may store information relevant to the campaign management, such as customer information. Other information may be stored in memory 160, such as instructions for operating input devices 130, display device 140 and output devices 150, but are not explicitly shown in FIG. 1 for clarity. Except for the shown elements 161-166, memory 160 may consist of components that are known in the art.

Figure 2:
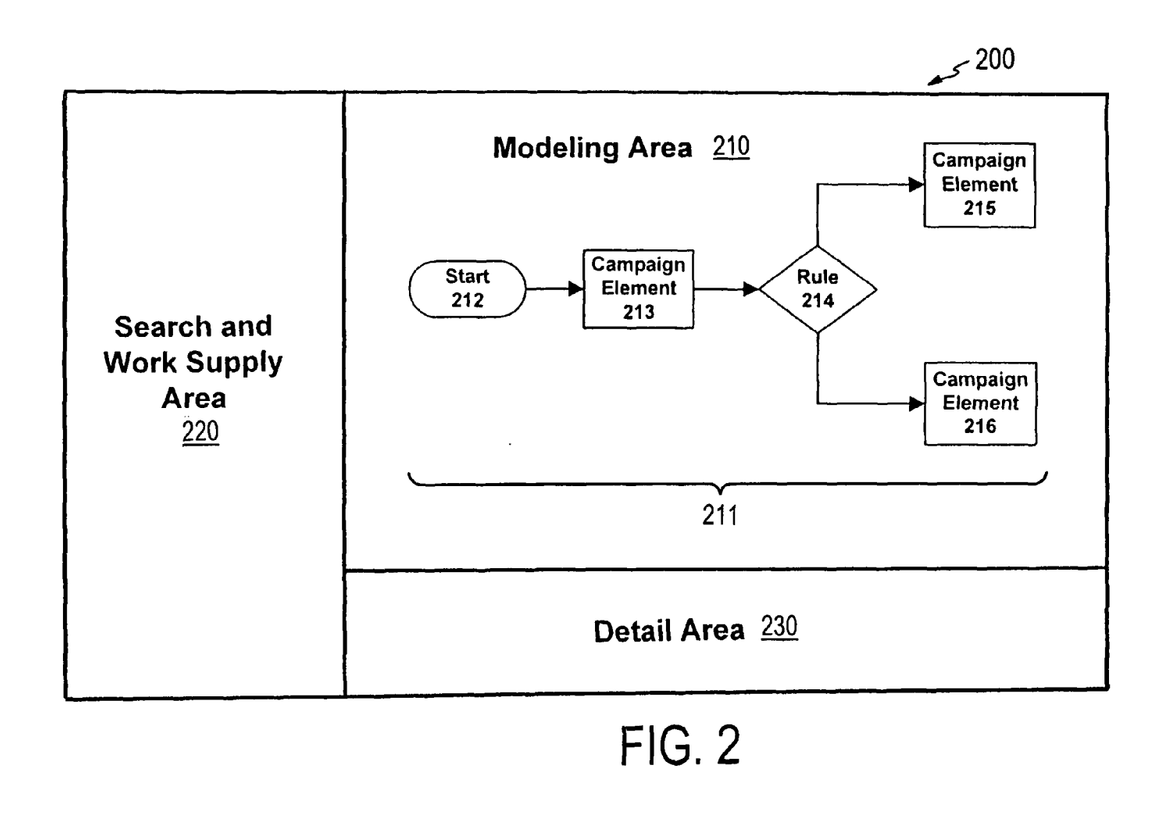
FIG. 2 is a schematic illustration of a screen view that may be displayed by the system shown in FIG. 1.

FIG. 2 is a schematic illustration of a screen view 200 that may appear on display device 140 during operation of the system 100. The view 200 may permit a user to create a marketing campaign that can be executed by the system 100. The system 100 may also display a graphical representation of a campaign that is being performed by the system 100.

The view 200 comprises a modeling area 210 that may be used to model a marketing campaign by assembling campaign elements. The modeling area 210 is also where a campaign may be displayed while it is being performed. The view 200 comprises a search and work supply area 200 that may provide searching for existing campaigns or an overview display of a campaign. A detail area 230 may display details of a campaign element selected in the modeling area 210 and may allow a user to define and modify any aspect of the campaign element.

The modeling area 210 is configured to display certain symbols and connections and interpret them as instructions for performing particular steps of a marketing campaign. For example, the modeling area 210 currently shows an illustrative marketing campaign 211 that is displayed as a flow diagram. Upon proper initiation, the system 100 may execute the marketing campaign 211 using for example the input devices 130 and the output devices 150 as will be described below.

The exemplary components of the marketing campaign 211 will now be described from the standpoint of how a user may create a marketing campaign in the system 100. It will be understood that in order to run marketing campaigns on system 100, it is not necessary that the campaigns are created or even modified using the system 100. Rather, existing marketing campaigns may be provided to system 100 and executed by it.

The user may indicate the starting point of a new marketing campaign by placing a Start symbol 212 in the modeling area. The user may then place a first campaign element 213 to the right of the Start symbol and link the two together with a flow line, indicating that following initiation (Start) of the marketing campaign 211, the system 100 will execute the first campaign element 213 as a first step in the marketing campaign 211.

The user may specify the details of the first campaign element 213 in detail area 230. The first campaign element 213 may comprise marketing activities directed to a number of customers through one or more communication channels, for example by email. Thus, when a first campaign step is initiated while running the campaign, the communication module 162 may execute the first campaign element 213 by transmitting emails to the customers using output devices 150.

The user may select the target group for the first campaign element 213. For example, the user can choose among records of customers in the database 166. The system 100 may store customer records that may be useful in marketing campaigns, such as customer email addresses, telephone numbers, etc. The detail area 230 may allow the user to selectively assemble target groups, and assign one or more target groups to a particular campaign.

As another example, a campaign step may involve calling a target group of customers. This may be implemented by operably connecting the output devices 150 with a call interaction center (CIC). Typically, a CIC includes a number of company representatives calling selected customers. When the first campaign step is initiated, the communication module 162 may trigger the output devices 150 to send the necessary information to the CIC. For example, the output devices 150 may provide the CIC with a script for the phone calls and telephone numbers for the customers. The phone calls may then be made by the CIC as instructed.

Another example is a campaign step that involves sending faxes to customers. This may be implemented by providing output devices 150 with facsimile functions, such as a fax machine or a computer modem with appropriate software. When such a campaign step is initiated, the communication module 162 may trigger the output devices 150 to send an existing fax document to the fax numbers of customers on a target list.

As another example, company representatives may contact the customers in person. Such a campaign step may be initiated by having the communication module 162 forward the relevant information to the representatives using output devices 150, which may include any suitable mode of communication, such as email. The information conveyed may include the name of the customer and what marketing message to convey. The company representative who receives the information may then convey the message to the customer at a meeting in person.

Another example is a campaign step that involves contacting the customers through a public computer network. For example, the company may create a website or other internet site, or edit an existing site, to publish the marketing message. Customers who visit the site may then be reached by the company's message.

As another example, the campaign step may involve sending letters with the marketing message to the customers. To implement such a step, the communication module 162 may trigger the output devices 150 to compile the letters, place the customer addresses on them, and print them so that they can be mailed to the customers.

The exemplary communication channels just described, and others that have not been described, have in common that customers typically can use them to respond to marketing activities from the company, whether or not the customer was contacted through the same channel as is being used for the response. For example, customers may communicate with the company by email, telephone, by fax, in person, through an internet site or by letter. And if such a communication contains a response by the customer to a preceding campaign step by the company, it may be desirable to efficiently detect and process the response regardless of how the customer was initially contacted.

The system 100 may take the received customer responses into account before executing subsequent campaign steps. This may for example involve the use of a rule 214, which is next in line after the campaign element 213 in the marketing campaign 211. The rule 214 may declare which customers should be targeted for one or more subsequent campaign steps. For example, according to the rule 214, the system 100 may direct campaign element 215 to customers from which the system 100 received a response to the campaign element 213. Similarly, the system 100 may direct campaign element 216 to customers from which no response was received. For example, campaign step 215 may be a sales offer targeted to the customers that expressed interest in the marketing campaign. Campaign element 216 may involve sending a reminder or another marketing message to the customers that have not yet responded. Accordingly, the system 100 may proceed along either or both paths following the rule 214. Rule 214 may involve predictive features to determine subsequent steps in the campaign.

The exemplary campaign 211 may end after the campaign elements 215 and 216. It should be understood that longer and shorter marketing campaigns could be modeled and/or executed on system 100. In particular, the modeling area 210 may display very complex marketing campaigns involving a great number of campaign elements and rules.

Figure 3:
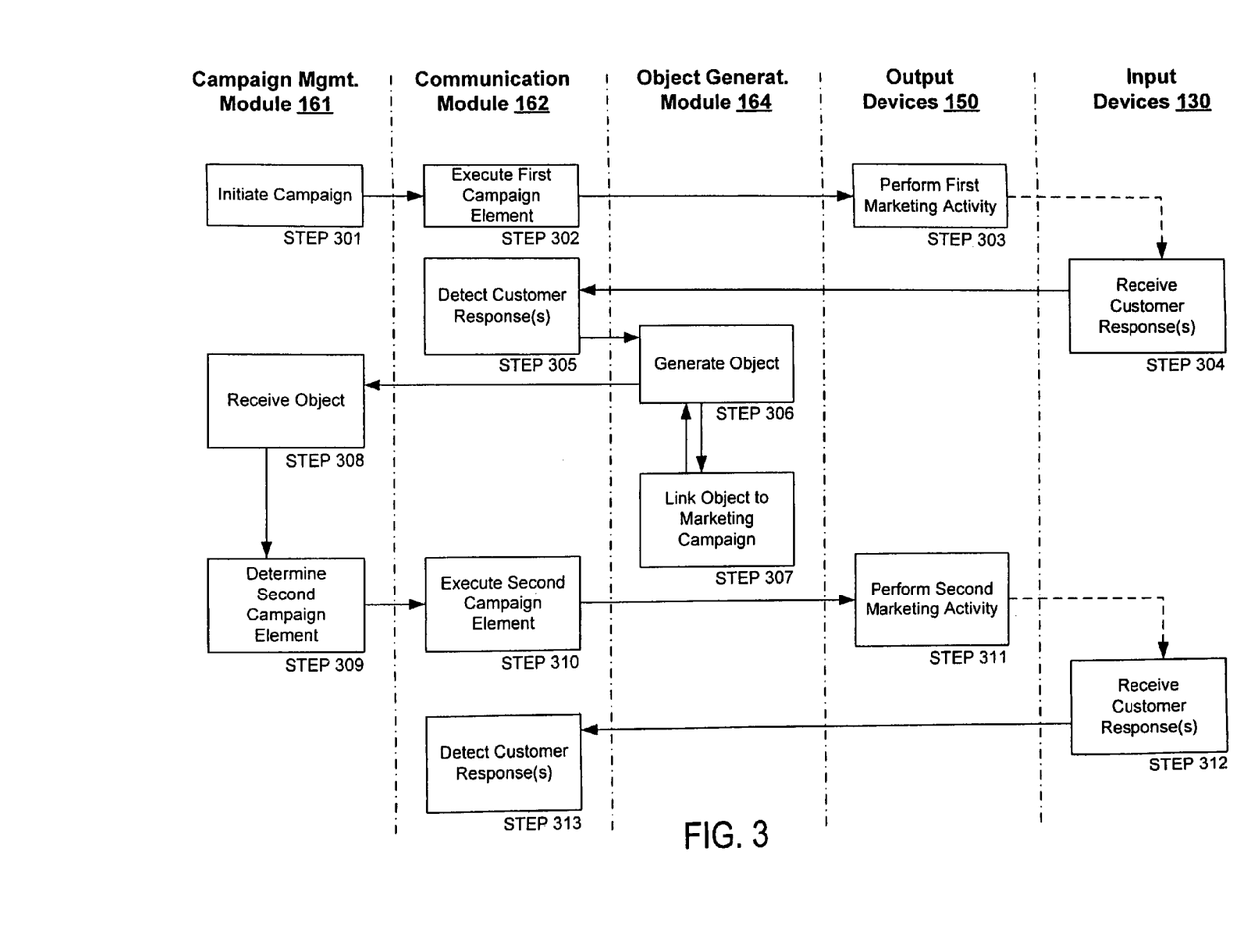
FIG. 3 is a flow diagram of a process in accordance with the invention.

With reference also to FIG. 3, an illustrious operation of the system 100 in executing a marketing campaign will now be described. The campaign management module 161 initiates the campaign in step 301. The initiation may be triggered by the user through input devices 130, or upon a predetermined event detected by the system 100. Initiation of the campaign causes the communication module 162 to execute the first campaign element in step 302. The communication module 162 may trigger the output devices 150 to perform the first marketing activity of the campaign in step 303. The first marketing activity may involve contacting the customers in the target group through one or more communication channels, such as by email, telephone, fax, in person, through the internet, or by mail.

Prior to the initiation of the campaign or in connection with initiating it, one or more other actions may be taken that will be described in more detail later. For example, the object generation module 164 may generate object(s) to be used in detecting customer responses, or a contact history in the database 166 for a customer contacted though the first campaign element may be updated.

In the FIG. 3 example, it is expected that some or all customers will respond to the first marketing activity and such responses are received in step 304. However, such responses likely will be received over a period of time, as opposed to all at once. Moreover, it is possible that customers will respond through a variety of communication channels, not necessarily the one(s) used in step 303. The dashed process flow from step 303 to step 304 indicates the potential indirectness of the response(s).

A customer response may be digital, such as an email or the use of an input function on an internet site. For example, the company may publish an electronic survey on an internet site and invite customers to respond to the survey online. The responses may be received using a uniform resource locator (URL) that is personalized for the company and/or for the marketing campaign. As another example, it may be detected that a customer is taking some action at a website controlled by the company running the marketing campaign, such as placing an order through the website. In such situations, the input devices 130 may receive customer responses through a conventional network and/or internet connection and channel the responses to the communication module 162 where they may be detected in step 305. Other customer responses may be entered into system 100 using the input devices 130. The input devices 130 may provide a suitable interface for a user to enter information regarding customer responses received by telephone, fax, in person, or by letter.

The communication module 162 detects the customer response(s) in step 305. The object generation module 164 in step 306 generates an object to contain information from a customer response, and links this object to the marketing campaign in step 307. The object may be linked to the marketing activity to which the customer responded, in this example the first marketing activity. Customer responses may be matched with marketing campaigns in at least three ways: (1) an automatic matching by the system 100, which may be a default choice if no other way has been implemented or is currently being used; (2) a customized matching, where the operator of system 100 has modified the procedures used in matching responses with campaigns; and (3) a manual override of the matching in examples (1) or (2). Examples of detecting customer responses, generating objects and linking them to the marketing campaign will now be described.

Visit activity files may be used for tracking personal contacts between company representatives and customers. The object generation module 164 may generate visit activity files as objects where the substance of a customer contact can be filled in. Thus, after the in-person meeting, the company representative may enter relevant information regarding the visit into the activity file, including the customer's response to the marketing campaign, if applicable. The visit activity files may be created prior to initiating the marketing campaign or in connection with executing the first campaign element. The visit activity file for a customer contacted through the first marketing activity may conveniently be linked to its corresponding marketing campaign and/or marketing activity when it is created or stored. Thus, certain aspects of step 306 may be carried out earlier in the marketing campaign and the object (visit activity file) may be updated when the customer response has been received. When the information from the in-person contact with the customer is entered, the object may be received by the campaign management module in step 308.

As another example, the campaign management module 161 may store customer contacts as a contact history in the database 166. A customer contact may be a record of an event when the company contacted the customer. The contact history may be used in matching a customer response with its corresponding marketing campaign, for example when a customer response is received in non-digital form, such as by telephone, letter or fax. The campaign management module 161 may store a reference to the marketing campaign and/or a reference to the first marketing activity in the contact history. When a response is received from the customer, the contact history can be searched to determine what marketing activities have been targeted at the customer. The found contact(s) may be used in linking the customer response object to the marketing campaign in step 307.

Customer phone numbers may be stored in database 166. They may be used in executing campaign elements that involve calling customers. In addition, they may be used for matching a telephonic customer response with the campaign and/or marketing activity that the customer is responding to. The input devices 130 may detect phone numbers of calling customers. The phone numbers may be used for identifying the customer who is calling. A customer contact history may then be consulted to determine the campaign(s) in which the customer has been contacted. If the customer responds by email, the customer's email address may be used in a similar way.

As another example, the company running the campaign may set up a particular telephone number where customers can respond. The response can then be matched with the marketing campaign (or a particular step thereof) by registering the phone number that the customer called.

Identifiers may be used in marketing campaigns. The first step of the marketing campaign may include an identifier to be used in linking a customer response to the marketing campaign. For example, the first marketing activity may offer the customer to place an order with the company. An order number provided with the first marketing activity may have encoded within it the identifier for the marketing campaign. When the customer responds referencing the order number, the number may be detected by the communication module 162 and used by the object generation module 164 in linking the object to the marketing campaign.

As another example, the system 100 may have a table of objects representing contacts stored in database 166. The table may comprise outbound contacts (e.g., marketing activities directed at customers) and inbound contacts (customer responses). Thus, when a customer response is received and an object corresponding to the response is generated, the object may be stored as an inbound contact in the table to link it to the marketing campaign. An outbound object corresponding to the marketing activity directed at the customer may be stored as an outbound contact in the table. This may be done prior to performing the marketing activity, in connection therewith, or retroactively after receiving the customer response.

The object generation module 164 may allow a user of the system 100 to modify the way(s) that customer responses are detected. This may be accomplished using the type of program referred to as a "business add-in" (BADI) in products available from SAP AG, Walldorf (Baden), Germany. The BADI may allow the user to specify new methods for matching customer responses with the marketing campaign. For example, the user may specify that an identifier should be included in the first campaign step in a different way than what may be provided by default. The BADI may also configure the object generation module 164 to "look" for additional or different contents of the customer responses.

It may be desirable to at least in part manually supervise how a customer response is matched to a marketing campaign. For various reasons, the marketing campaign with which the system 100 matches a customer response may not be the most preferred campaign for further contacts with that customer. As an example, assume that the customer responds by making a phone call to a CIC controlled by the company operating the system 100. The agent that handles the customer's response may enter the response information into the system 100 and the object generation module 164 may generate an object containing the information as has been described above. The object generation module 164 identifies a particular marketing campaign (or step thereof) with which the generated object should be matched. To allow the CIC agent some input in the matching of the response with a marketing campaign, the system 100 may identify the marketing campaign selected by the object generation module 164 to the CIC agent. This may be done using display device 140 or output devices 150. If the CIC agent believes another marketing campaign is more suitable for this particular customer, the agent may identify that campaign using input devices 130, for example by choosing between marketing campaigns displayed in a list. The input by the CIC agent overrides the system's selection of marketing campaign. The next campaign step carried out toward this customer will be the following step of the marketing campaign selected by the agent, in lieu of the step that would have followed in the campaign selected by the system.

The campaign management module 161 receives the object containing information from the customer response in step 308. The object may be used in determining subsequent campaign steps. Particularly, the campaign management module 161 may take the received object into account when determining the second campaign element in step 309. For example, the second campaign element may be executed differently to different customers. As mentioned above with regard to the campaign elements 215 and 216 in FIG. 2, a different campaign element may be targeted at customers who responded to the first step than those who did not respond. Accordingly, the execution of the second campaign element by the communication module 162 in step 310, and the performance of the second marketing activity by the output devices 150 in step 311, may depend on the object(s) received in step 308.

Customer responses to the second campaign element may be received in step 312 in analogy with the description above regarding step 304. Moreover, the communication module 162 may detect the response(s) in step 313, similar to the description of step 305 above. For clarity, FIG. 3 does not show any further process flows of the marketing campaign. However, it should be understood that any number of campaign elements and corresponding process flow steps might follow in the marketing campaign. For example, the customer response to the second marketing activity may be processed along the lines described for the first response, and may be used in determining a third element of the marketing campaign, etc.

A number of embodiments of the invention have been described. Nevertheless, it will be understood that various modifications may be made without departing from the spirit and scope of the invention. Accordingly, other embodiments are within the scope of the following claims.

We claim:

1. A method of managing a marketing campaign using a computer system, the method comprising:
   determining, using a computer system, an identifier for a first marketing campaign;
   performing a first campaign step of the first marketing campaign, the first campaign step being directed at a plurality of customers, the identifier applying to the first marketing campaign with regard to each of the plurality of customers;
   encoding, using a processor in the computer system, the identifier for the first marketing campaign in an order number to be included in the first campaign step, the order number being unique to a first customer of the plurality of customers that is targeted by the first campaign step;
   including, in the computer system, the order number in the first campaign step such that the identifier can be detected in a response by the first customer to the first campaign step, in which response the first customer places an order corresponding to the order number;
   providing that the response to the first campaign step from the first customer can be received, at the computer system, through any of a plurality of communication channels, the plurality of communication channels including at least mail, a public computer network, fax and electronic mail;
   receiving, at the computer system, the response to the first campaign step from the first customer through one of the communication channels, wherein the response includes the order number encoded with the identifier for the first marketing campaign, the order number indicating that the response is received from the first customer and that the response pertains to the first marketing campaign;
   detecting, using the computer system, from the received response the identifier encoded in the order number that is included in the first customer's response;
   using the detected identifier in matching, in the computer system, the response with the first marketing campaign;
   generating, using the computer system, and storing in a computer memory a first object that represents the first customer's order in response to the first campaign step and contains information from the response;
   servicing the first customer's order using the order number; and
   using the information in the first object to match, in the computer system, the first object with the first marketing campaign.

2. The method of claim 1, wherein matching the response with the first marketing campaign comprises matching the response with the first campaign step.

3. The method of claim 1, wherein the customer's response comprises one selected from the group consisting of an electronic response to a survey, an action taken at a web site, and combinations thereof.

4. The method of claim 3, wherein the response is received using a personalized URL.

5. The method of claim 1, further comprising linking the first object to the first marketing step.

6. The method of claim 1, further comprising:
   identifying the first marketing campaign to a person to whom the customer's response is routed;
   receiving input from the person that identifies a second marketing campaign and instructs that the second marketing campaign be directed at the customer in lieu of the first marketing campaign; and
   linking the first object to the second marketing campaign.

7. The method of claim 1, wherein matching the response with the first marketing campaign comprises searching a database for a contact history associated with the customer.

8. The method of claim 7, wherein searching the database comprises retrieving a campaign step through which the customer has been contacted.

9. The method of claim 7, wherein the search is performed after the customer responds by at least one of mail and fax.

10. The method of claim 1, further comprising generating a second object corresponding to the first campaign step and registering the second object in a table as an outbound contact.

11. The method of claim 10, further comprising registering the first object in the table as an inbound contact.

12. The method of claim 10, wherein the second object is generated retroactively after receiving the response.

13. A system for managing a marketing campaign, the system comprising:
   program instructions comprising a communication module stored in computer-readable medium that, when executed by a processor, is capable of executing a first campaign step of a first marketing campaign, the first campaign step being directed at a plurality of customers, the communication module being capable of handling a response to the first campaign step from a first customer of the plurality of customers received through any of a plurality of communication channels, the plurality of communication channels including at least mail, a public computer network, fax and email, wherein an identifier is determined for the first marketing campaign, the identifier applying to the first marketing campaign with regard to each of the plurality of customers, the identifier for the first marketing campaign encoded in an order number to be included in the first campaign step, the order number included in the first campaign step such that the identifier can be detected in the response by the first customer of the plurality of customers to the first campaign step, in which response the first customer places an order corresponding to the order number, the order number being unique to the first customer of the plurality of customers that is targeted by the first campaign step, the response including the order number encoded with the identifier for the first marketing campaign, the order number indicating that the response is received from the first customer and that the response pertains to the first marketing campaign, and wherein from the received response the identifier encoded in the order number is detected in the order number that is included in the first customer's response and the detected identifier is used in matching the response with the first marketing campaign;

program instructions comprising an object generation module stored in computer-readable medium that, when executed by a processor, is capable of generating and storing in a memory a first object that represents the first customer's order in response to the first campaign step and contains information from the first customer's response to the first campaign step; and program instructions comprising a campaign management module stored in computer-readable medium that, when executed by a processor, instructs the communication module to execute the first step of the marketing campaign, wherein the communication module instructs the object generation module to generate and store in the memory the first object that represents the first customer's response to the first campaign step, wherein the object generation module uses the information in the first object to match the first object with the first marketing campaign and wherein the campaign management module receives the first object from the object generation module wherein the system services the first customer's order using the order number.

14. The system of claim 13, wherein the communication module is capable of identifying the first marketing campaign to a person associated with receiving the customer's response and receiving input from the person that identifies a second marketing campaign and instructs that the second marketing campaign be directed at the customer in lieu of the first marketing campaign.

15. The system of claim 13, wherein the first campaign step is represented by a first campaign element.

16. The system of claim 13, further comprising a database containing a contact history associated with at least one of the customers.

17. The system of claim 13, further comprising an identifier included in the first campaign step, wherein the object generation module is capable of using the identifier in matching the response with the first marketing campaign.

18. The system of claim 13, further comprising a table for storing objects corresponding to inbound and outbound contacts.

19. The system of claim 18, further comprising a second object corresponding to the first campaign step, the second object being registered in the table as an outbound contact.

20. The system of claim 18, wherein the first object is registered in the table as an inbound contact.

21. Computer-readable medium with program instructions stored thereon that when executed by a processor perform the following functions for managing a marketing campaign:

determines an identifier for a first marketing campaign;

performs a first campaign step of the first marketing campaign, the first campaign step being directed at a plurality of customers, the identifier applying to the first marketing campaign with regard to each of the plurality of customers;

encodes the identifier for the first marketing campaign in an order number to be included in the first campaign step, the order number being unique to a first customer of the plurality of customers that is targeted by the first campaign step;

includes the order number in the first campaign step such that the identifier can be detected in a response by the first customer to the first campaign step, in which response the first customer places an order corresponding to the order number;

provides that the response to the first campaign step from the first customer can be received through any of a plurality of communication channels, the plurality of communication channels including at least, mail, a public computer network, fax and electronic mail;

receives the response to the first campaign step from the first customer through one of the communication channels, wherein the response includes the order number encoded with the identifier for the first marketing campaign, the order number indicating that the response is received from the first customer and that the response pertains to the first marketing campaign;

detects from the received response the identifier encoded in the order number that is included in the first customer's response;

uses the detected identifier in matching the response with the first marketing campaign;

generates and stores in a computer memory a first object that represents the first customer's order in response to the first campaign step and contains information from the response;

services the first customer's order using the order number; and uses the information in the first object to match the first object with the first marketing campaign.

22. The medium of claim 21, further comprising:

searches a database for a contact history associated with the customer and uses the contact history to match the response with the first marketing campaign.

23. The medium of claim 21, further comprising:

generates a second object corresponding to the first campaign step and registers the second object in a table as an outbound contact.

* * * * *